United States Patent [19]
Takekoshi

[11] 3,868,389
[45] Feb. 25, 1975

[54] METHOD FOR MAKING N-SUBSTITUTED NITROPHTHALIMIDES
[75] Inventor: Tohru Takekoshi, Scotia, N.Y.
[73] Assignee: General Electric Company
[22] Filed: June 22, 1973
[21] Appl. No.: 372,744

[52] U.S. Cl. .................. 260/326 N, 260/326 R
[51] Int. Cl. ............... C07d 27/00, C07d 27/52
[58] Field of Search .............. 260/326 X, 326 R

[56] References Cited
UNITED STATES PATENTS
3,314,923  4/1967  Muller et al. ......................... 260/78
3,701,756  10/1972  Carletan et al. ................ 260/326 R
3,712,907  1/1973  Gilch et al. ..................... 260/326 A Primary Examiner—Elbert L. Roberts
Attorney, Agent, or Firm—William A. Teoli; Joseph T. Cohen; Jerome C. Squillaro

[57] ABSTRACT

A method is provided for making N-substituted nitrophthalimides and bis(nitrophthalimide)s. Reaction is effected between nitrophthalic anhydride and an organic isocyanate or organic diisocyanate in the presence of an alkali carbonate catalyst such as potassium carbonate. The nitrophthalimides are intermediates for making aromatic etherphthalimides and polyetherimides.

7 Claims, No Drawings

METHOD FOR MAKING N-SUBSTITUTED NITROPHTHALIMIDES

The present invention relates to a method for making N-substituted nitrophthalimides and bis(nitrophthalimide)s using nitrophthalic anhydride and organic isocyanate or organic diisocyanate.

Prior to the present invention N-substituted nitrophthalimides of the formulas

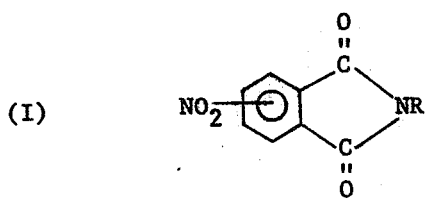

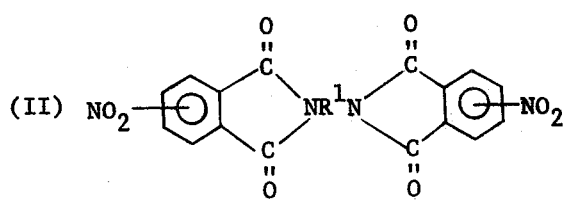

were made by effecting reaction between organic diamines and nitrophthalic anhydride employing aprotic polar solvents as shown by Japanese Pat. No. 19,858,169. These N-substituted nitrophthalimides are intermediates for making aromatic etherimides, polyetherimides and aminophthalimides. The use of organic diamines with nitrophthalic anhydrides to produce compounds of formulas I and II results in the production of water. In addition, the process is rendered less economical because expensive aprotic polar solvents, such as N-methyl pyrrolidone are employed. Further, reaction times exceeding several hours and elevated temperatures, such as 200°C are needed.

Another method for making N-substituted phthalimides from phthalic anhydrides is based on the use of an organic isocyanate. One of the advantages of using organic isocyanate over organic amine is that the organic isocyanate does not result in the production of water. Reaction between phthalic anhydride and the organic isocyanate can be facilitated with polar organic solvents. In addition, improved reaction rates can be realized with materials such as Lewis acids, tertiary amines, phosphines, etc. which have been found to be effective as catalysts. However, phthalic anhydrides have nitro substitution on the ring, exhibit reduced reaction rates with organic isocyanates. It also has been found that temperatures of 180°C or above are often required to effect reaction between such nitro substituted anhydrides and organic isocyanates even when the aforementioned catalysts are used. A further complication is that nitro-substituted phthalic anhydrides can start to decompose above 200°C and also destroy oxidatively sensitive catalysts such as tertiary amines and phosphines.

The present invention is based on the discovery that N-substituted nitrophthalimides of formulas I and II can be made in an inexpensive non-polar solvent in a comparatively short period, if an effective amount of an alkali metal carbonate, and preferably potassium carbonate is used as a catalyst for the coreaction of a nitrophthalic anhydride of the formula

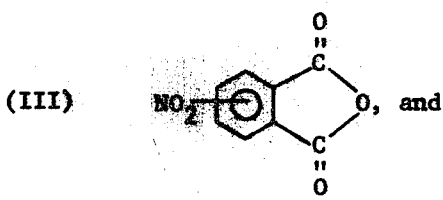

organic isocyanate selected from $$RNCO, \quad (IV)$$

and $$OCNR^1NCO, \quad (V)$$

where R is a $C_{(1-13)}$ monovalent organo radical and $R^1$ is a $C_{(1-30)}$ divalent organo radical.

R is more particularly $C_{(6-13)}$ aryl radicals such as phenyl, xylyl, tolyl, naphthyl, anthryl; chlorophenyl, bromonaphthyl, etc. $C_{(1-8)}$ alkyl radicals such as methyl, ethyl, propyl, butyl, pentyl, hexyl, heptyl, octyl, etc. $R^1$ can be $C_{(6-13)}$ arylene radicals such as phenylene, tolylene, xylylene, naphthylene, etc.; chlorophenylene, chlorotolylene, bromonaphthylene, etc.; $C_{(1-8)}$ alkylene radicals such as methylene, dimethylene, trimethylene, tetramethylene, etc. $R^1$ also can be divalent arylene radicals such as

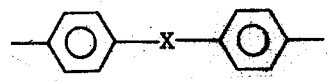

where X is selected from $C_nH_{2n}$,

—O—, etc., where $n$ is equal to 1–8.

There is provided by the present invention, a method for making N-substituted nitrophthalimide which comprises 1. effecting reaction between a nitrophthalic anhydride and organic isocyanate in a non-polar organic solvent in the presence of an effective amount of an alkali carbonate, and 2. recovering from the mixture of (1), the N-substituted nitrophthalimide.

Included by the nitrophthalic anhydride of formula III are, for example, 3- and 4-nitrophthalic anhydrides. Included by the organic isocyanate of formula IV are, for example, phenyl isocyanate, tolyl isocyanate, naphtyl isocyanate, 4-ethylphenyl isocyanate, 4-chlorophenyl isocyanate, octyl isocyanate, cyclohexyl isocyanate, etc. Included by the organic diisocyanate of formula V are, for example, m-phenylene isocyanate, p-phenylene isocyanate, 2,4-tolylene diisocyanate, 2,6-tolylene diisocyanate, diphenylmethane-2,4-diisocyanate, diphenylmethane-4,4'-diisocyanate, hexamethylene diisocyanate.

In the practice of the invention, reaction is effected between the nitrophthalic anhydride and the organic isocyanate, which hereinafter will signify either the monoisocyanate of formula IV or the diisocyanate of formula V. Reaction is effected in the presence of a non-polar solvent and an effective amount of an alkali carbonate catalyst.

Temperatures of from 130°C to 230°C can be employed, and preferably from 150°C to 180°C. During reaction it has been found desirable to employ an inert atmosphere, such as nitrogen, and utilize substantially anhydrous conditions. Agitation, such as stirring of the mixture has been found to facilitate the removal of carbon dioxide formed during the formation of the N-substituted nitrophthalimide.

Suitable organic solvents are any non-polar organic solvents which do not interfere with the reactants. Suitable non-polar solvents which can be employed in the practice of the invention include, for example, xylene, ethylbenzene, chlorobenzene, dichlorobenzenes, trichlorobenzenes, diphenylether, benzophenone, biphenyl, chlorinated biphenyl, etc.

Depending upon whether the monoisocyanate or diisocyanate is used, appropriate molar ratios can be employed. For example, there can be used from 0.8 to 1.2 moles of monoisocyanate, per mole of nitro anhydride, while substantially equal molar amounts are preferred. In instances where diisocyanate is used, from 0.4 to 0.6 moles of diisocyanate, per mole of nitro anhydride can be used, and preferably 0.5 mole.

The alkali carbonates can be employed at catalytic amounts such as from 0.01 to 1 per cent by weight of the reaction mixture. In addition to potassium carbonate, there also can be employed alkali carbonate such as sodium carbonate, lithium carbonate, etc.

Recovery of the N-substituted nitrophthalimide from the reaction mixture can be achieved by standard techniques. Reaction times can vary from 0.5 to 3 hours or less depending upon such factors as the degree of agitation, and the nature of either the monoisocyanate, diisocyanate or the nitrophthalic anhydride as well as the catalyst and amount utilized. At the termination of the reaction, for example, the mixture can be allowed to cool and treated with such materials as methanol, etc. to effect the precipitation of the N-substituted imide.

In order that those skilled in the art will be better able to practice the invention, the following examples are given by way of illustration and not by way of limitation. All parts are by weight.

EXAMPLE 1

There was heated a mixture of 3.5 parts of 3-nitrophthalic anhydride, 2.16 parts of phenyl isocyanate and about 5 parts of ortho-dichlorobenzene at a temperature of about 180°C under nitrogen. There was added to the mixture 0.003 part of potassium carbonate while the mixture was stirred. There was an immediate evolution of carbon dioxide. After about 40 minutes, the reaction was complete. The mixture was then allowed to cool to room temperature and treated with an excess of methanol. A precipitation of product occurred which was filtered and dried. There was obtained a 98% of yield of product. Based on method of preparation the product was N-substituted 3-nitrophthalimide.

The above procedure was repeated, except that in place of the potassium carbonate there was utilized 0.003 part of stannic oxide, a well known catalyst for organic anhydride, organic isocyanate reaction. Carbon dioxide evolved slowly and the color of the reaction mixture changed from a light yellow to orange-red. After three hours of heating at 180°C, the conversion was only 23% as determined by vpc.

EXAMPLE 2

A mixture of 14.25 parts of toluene diisocyanate in the form of a mixture of 80% of the 2,4-isomer and 20% of the 2,6-isomer, 31.63 parts of 3-nitrophthalic anhydride, about 25 parts of ortho-dichlorobenzene was stirred at a temperature between 175°–180°C. There was added 0.01 part of anhydrous potassium carbonate resulting in a vigorous $CO_2$ evolution. The reaction mixture was heated for 3 hours and cooled to room temperature. It was treated with about 50 parts of methanol to effect the precipitation of product. A crystalline product was recovered by filtration. After drying under vacuum, the yield of the product was found to be 98.7%. Based on method of preparation the product was bis(3-nitrophthalimido)toluene.

The above procedure repeated, except that in place of the potassium carbonate there was employed tetramethylammonium bromide which was used in a proportion of about eight times the weight of the potassium carbonate. The mixture was refluxed at about 175°C for approximately 2 hours during which time the reaction slowed down. An equal amount of tetramethylammonium bromide was again added to the mixture and the reaction resumed. It was further heated for an additional two hours. The mixture was then allowed to cool to room temperature and diluted with methanol. A precipitate was obtained which was collected by filtration, washed with methanol and then dried. The yield of the product was approximately 89%.

Although the above shows that tetramethylammonium bromide served as an effective catalyst for the reaction of the toluene diisocyanate and ortho-dichlorobenzene, those skilled in the art would know that it failed to maintain the reaction over the three hour period because the reaction slowed down and an additional catalyst had to be employed.

EXAMPLE 3

A mixture of 9.9 parts of the toluene diisocyanate mixture of Example 2, 22.2 parts of 4-nitrophthalic anhydride, and 0.01 part of sodium carbonate was stirred and heated at 170°C for 6 hours and 180°C for 3 hours. The reaction mixture was then allowed to cool to room temperature. There was obtained an 89.6% yield of product. Based on method of preparation the product was bis(4-nitrophthalimido)toluene.

The above procedure was repeated except that in place of the sodium carbonate there was employed an equivalent amount of tetramethylammonium bromide as a catalyst. The reaction was very slow. After 2 hours of the reaction, the bisimide was not formed in any significant quantity.

EXAMPLE 4

A mixture of 3.37 parts of diphenylmethane-4,4'-diisocyanate, 5.75 parts of 3-nitrophthalic anhydride and 5 parts of ortho-dichlorobenzene was heated at 160°C under nitrogen. To this mixture there was added 0.005 part of potassium carbonate and it was heated at 180°C for 2 hours. The reaction mixture was cooled and diluted with 10 parts of methanol. The precipitate of bis(nitroimide) was filtered, washed with methanol and dried. There was obtained 7.06 parts (95.5%) of 4,4'-bis(3-nitrophthalimide)-diphenylmethane.

What I claim as new and desire to secure by Letters Patent of the United States is:

1. A method for making N-substituted nitrophthalimides which comprises
   1. effecting reaction between a nitrophthalic anhydride and organic isocyanate in a non-polar organic solvent in the presence of an effective amount of an alkali carbonate, and
   2. recovering the N-substituted nitrophthalimide from the mixture of (1).

2. A method in accordance with claim 1, where the nitrophthalimide has the formula

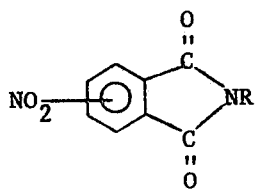

where R is a $C_{(1-13)}$ monovalent organo radical.

3. A method in accordance with claim 1, where the nitrophthalimide has the formula

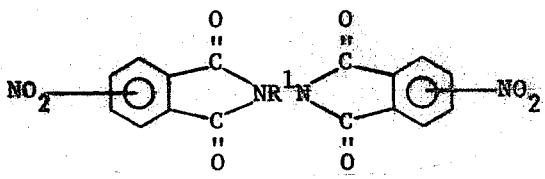

where $R^1$ is a $C_{(1-30)}$ divalent organo radical.

4. A method in accordance with claim 1, where the alkali carbonate is potassium carbonate.

5. A method in accordance with claim 1, where the organic isocyanate is phenyl isocyanate.

6. A method in accordance with claim 1, where the organic isocyanate is toluene diisocyanate.

7. A method in accordance with claim 1, where the diisocyanate is diphenylmethane-4,4'-diisocyanate.

* * * * *